United States Patent [19]
Dunne et al.

[11] Patent Number: 5,125,546
[45] Date of Patent: Jun. 30, 1992

[54] FLOW DISCHARGE VALVE

[75] Inventors: Stephen T. Dunne, Ipswich; Terence E. Weston, Woodbridge, both of United Kingdom

[73] Assignee: DMW (Technology) Limited, Woodbridge, United Kingdom

[21] Appl. No.: 557,936

[22] Filed: Jul. 11, 1990

Related U.S. Application Data

[63] Continuation-in-part of PCT/GB89/01394, Nov. 22, 1989.

[30] Foreign Application Priority Data

| Nov. 22, 1988 | [GB] | United Kingdom | 8827197 |
| Dec. 8, 1988 | [GB] | United Kingdom | 8828750 |
| Jan. 26, 1989 | [GB] | United Kingdom | 8901648 |
| Mar. 21, 1989 | [GB] | United Kingdom | 8906512 |

[51] Int. Cl.$^5$ .............................................. B01D 83/14
[52] U.S. Cl. .................... 222/394; 222/402.18; 222/402.22; 222/402.24
[58] Field of Search ............... 222/394, 402.1–402.25; 239/337, 590.3, 590.5, 592, 577

[56] References Cited

U.S. PATENT DOCUMENTS

| 3,069,098 | 12/1962 | Frangos et al. | 222/402.18 X |
| 3,520,450 | 7/1970 | Prussin et al. | 222/402.22 X |
| 3,568,888 | 3/1971 | Baldoni | 222/402.17 X |
| 3,680,738 | 8/1972 | Vos et al. | 222/402.12 X |
| 3,854,636 | 12/1974 | Conway et al. | 222/402.24 |
| 3,982,668 | 9/1976 | Riccio | 222/402.18 X |
| 4,117,958 | 10/1978 | Spitzer et al. | 222/402.18 X |
| 4,122,978 | 10/1978 | Grimond et al. | 222/402.1 X |
| 4,230,243 | 10/1980 | Spitzer et al. | 222/402.18 |
| 4,401,272 | 8/1983 | Merton et al. | 239/337 |
| 4,431,119 | 2/1984 | Stoody | 222/402.18 X |

FOREIGN PATENT DOCUMENTS

| 0008109 | 2/1980 | European Pat. Off. |
| 0133770 | 3/1985 | European Pat. Off. |
| 1289797 | 2/1969 | Fed. Rep. of Germany |
| 1954740 | 5/1970 | Fed. Rep. of Germany |
| 2157569 | 6/1973 | France |
| 98232 | 6/1961 | Netherlands | 222/402.18 |

OTHER PUBLICATIONS

Muir and Eichhorn, "Compressible Flow of an Air–Water Mixture (etc.)", 1963, Heat Transfer and Fluid Mechanism Institute, pp. 83–104.

Van Wijngaarden, "One-Dimensional Flow of Liquids Containing Small Gas Bubbles", 1972, pp. 369–396.

*Primary Examiner*—Michael S. Huppert
*Assistant Examiner*—Kenneth DeRosa
*Attorney, Agent, or Firm*—Lee, Mann, Smith, McWilliams, Sweeney & Ohlson

[57] ABSTRACT

A process and a discharge valve assembly are provided for regulating the flow of a liquid product from an aerosol container which is pressurized with a permanent gas propellant. The liquid product is conveyed under pressure to a mixing region and the propellant gas is separately conveyed to the mixing region. The mixture is passed through at least one choke restrictor that is located between the mixing region and the discharge nozzle. The mixture expanding downstream of the restrictor forms a foam-like mixture internally of the valve assembly and prior to discharge of the mixture from the exit nozzle.

51 Claims, 9 Drawing Sheets

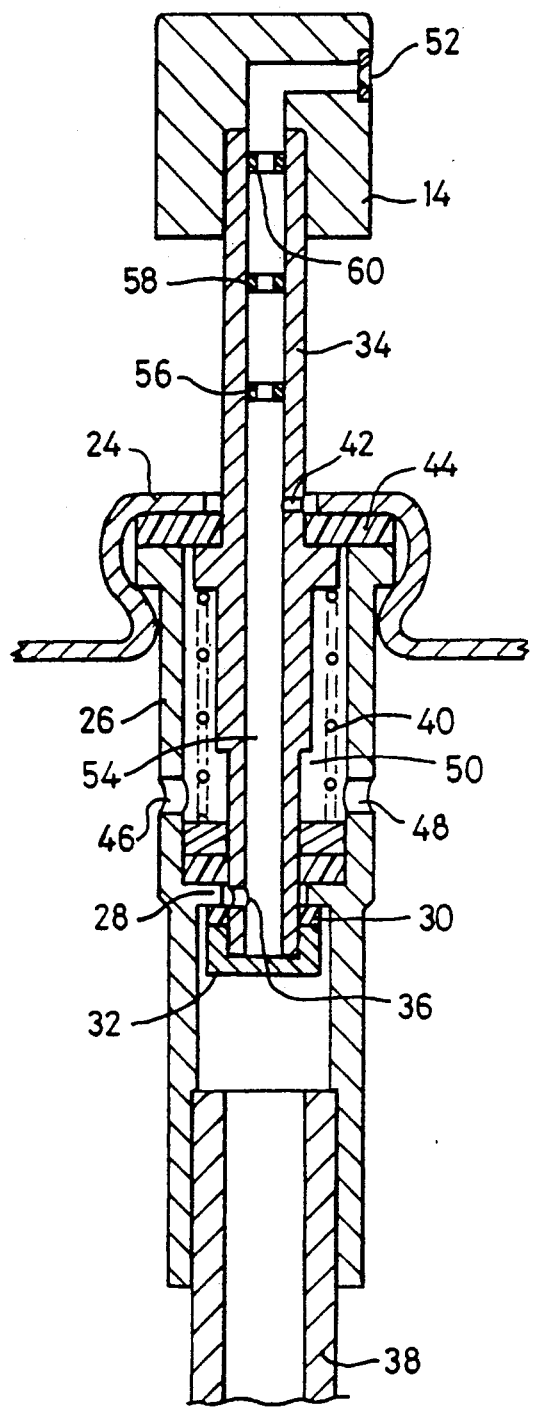
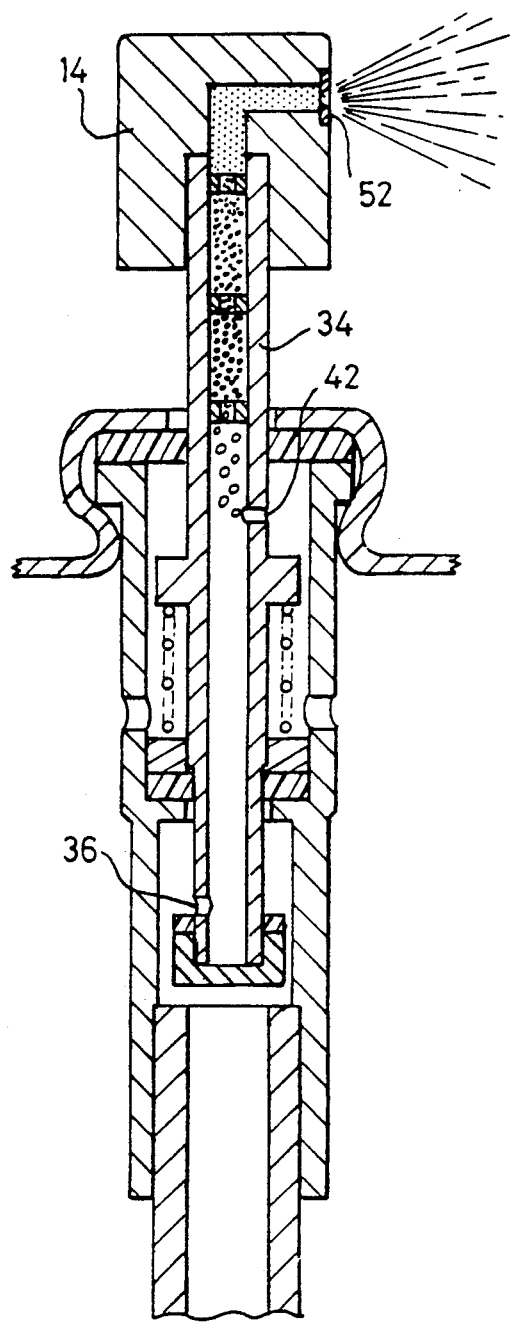
Fig. 3a                    Fig. 3b

FLOW DISCHARGE VALVE

The present application is a contination-in-part of International Application No. PCT/GB89/01394 filed on Nov. 22, 1989.

FIELD OF THE INVENTION

This invention concerns flow discharge control devices, sometimes referred to as regulators for controlling the flow of fluids (usually in the form of atomized droplets) from pressurized containers, and to a method of so regulating flow.

BACKGROUND OF THE INVENTION

In view of the resistance to the continued use of chlorofluorocarbons (CFCs) as propellants in so-called aerosols (pressurized containers for dispensing and atomising liquids), other propellants have had to be considered. Low boiling point gases such as propane, butane and dimethylether have been used, but have other disadvantages which render them undesirable for this particular purpose.

The advantage of using a low boiling point gas (which is in liquid form at normal ambient temperatures), is that a constant pressure within the container is maintained while any of the liquid gas remains in the container, so ensuring a relatively constant propellant pressure source throughout the whole of the discharge life of the container. This advantage is not realized if a permanent gas such as nitrogen is used as the propellant. If such a gas is used, the propellant pressure drops during the discharge due to the increasing volume which it must occupy as the liquid is to be discharged from the container. Since the temperature remains approximately constant, the decrease in pressure is substantially proportional to the increase in volume within the container. The reducing pressure results in a change in spray characteristics such a spray angle, droplet size and distribution.

A number of regulators have been proposed to provide constant mass flow rate by compensating for the falling pressure, but most have involved moving parts such as spring loaded pistons which increase costs and decrease reliability; and it is an object of the present invention to provide a regulator or discharge valve, and a method of so regulating flow, which will produce a substantially constant spray characteristic over a considerable range of propellant pressure.

SUMMARY OF THE INVENTION

According to one aspect of the present invention there is provided a discharge valve for regulating the flow of a liquid product from an aerosol container pressurized substantially by a permanent gas propellant and comprising:

(a) first passage means for conveying the liquid under gas pressure to a mixing region, (b) second passage means for conveying the pressurized gas separately from the liquid into the mixing region, (c) an exit nozzle through which the mixture of liquid and gas is forced to exit from the container, and (d) at least one intermediate restrictor between the mixing region and the exit nozzle through which the mixture of liquid and gas is forced to pass, wherein:

(e) the relative size of the restrictor is selected to ensure that at least substantially choked or sonic flow results through the restrictor.

The dimensions of the exit orifice are chosen to ensure the required spray characteristics.

The term choked flow in this context means that the flow through the nozzle is sonic. This phenomena of choked liquid/gas mixed flow is described inter alia by J F Muir et al in an article entitled "Compressible flow of an air/water mixture through a vertical two-dimensional converging diverging nozzle", published in the proceedings of the 1963 Heat Transfer and Fluid Mechanics Institute, edited by A Roshko et al, 1963 and by L.van Wijnqaarden, in a paper entitled "One-Dimensional Flow of Liquids Containing Small Gas Bubbles", 1972.

The pressurized liquid is preferably forced into the mixing chamber via a flow controlling orifice which may be formed in a narrow bore dip-tube.

The pressurized gas is also preferably conveyed through a small orifice into the mixing chamber, again for the purpose of controlling the flow rate.

The mixing chamber may be cylindrical in shape.

Where a dip tube is employed the mixing chamber may be formed as an extension of the dip tube.

The second passage means may be formed in the dip tube; and the dip tube, may be porous, thereby constituting the first passage means.

Alternatively the second passage means may comprise a porous membrane.

The diameter of the or each intermediate restrictor is preferably in the range 10% to 60% of the diameter of the cylindrical mixing chamber.

In absolute terms the diameter of the intermediate restrictor for ordinary applications will generally be in the range 0.2 to 1.2 mm.

In some arrangements it may be advantageous for the restrictor to be in the form of a capillary tube.

According to a preferred feature of the invention the pressurized gas (which is supplied to the mixing chamber) may also be employed to pressurise the liquid (to force it into the mixing chamber).

By ensuring good mixing in the mixing chamber and by ensuring that the residual pressure which remains across the (or each) intermediate orifice when the liquid content is about to become exhausted, is still sufficiently high to produce at least substantially choked flow through the intermediate orifice (or each intermediate orifice) and thereby produce a shock wave after each orifice, the form and characteristics of the final spray at the exit orifice are found to remain essentially constant throughout the discharge of the liquid content.

Thus the exit orifice is presented with a foaming mixture similar to that normally produced by liquified gas propellants as they start to boil or evaporate upstream of the exit nozzle.

In some applications, it may be desirable to limit the reduction of liquid exhausted via the exit orifice during the discharge life of the container.

While it is virtually impossible to achieve no change in the liquid flow through the exit orifice with decreasing propellant pressure, it is believed that any variation can be significantly reduced if:

(1) the pressure drop between the propellant pressure and mixing region pressure is kept as small as possible;

(2) the pressure drop produced by the flow of liquid is essentially due to a velocity increase due to a decrease in passage diameter; and (3) the second passage means delivering the gas to the mixing region essentially creates laminar flow conditions in the gas.

By using different flow type passages obeying different physical laws, the proportion of gas/liquid can be selected so as to alter (and if desired limit) the liquid flow reduction via the exit nozzle, by compensating for the effect of pressure reduction on flow through the choked intermediate restrictor(s).

The critical pressure ratio needed to achieve choking in any liquid/gas mixture is in general a function of pressure and volumetric mixture proportions and can if necessary be determined by experiment. A minimum sonic velocity (and hence pressure ratio) is usually achieved at mixtures of approximately 50% gas and 50% liquid.

In accordance with another aspect of the present invention in a discharge valve of a type as defined in subparagraphs (a) to (d) above, the size of the passage means are so selected in relation to the size of the intermediate restrictor that the volumetric ratio of gas to liquid dispensed at atmospheric pressure is less than approximately 5:1.

Where it is desirable that the discharge is to be unaffected by the attitude of the container, the liquid may for example be contained in a collapsible sachet within the container and subjected to the pressure of the gas occupying the space between the sachet and the container wall, to thereby pressurise the liquid within the sachet. This arrangement also prevents loss of propellant gas in the event that the release valve is operated whilst the container is upturned, as would otherwise be the case.

Conventional aerosol dispensers use a volatile propellant such as a liquefied chlorofluorocarbon and incorporate a normally closed on/off valve associated with a dip tube up through which liquid passes when the valve at the top is opened. A push-on nozzle containing a small orifice completes the discharge passage and atomisation can be achieved if the size of the outlet orifice is selected accordingly.

According therefore to a further aspect of the present invention there is provided a kit of parts which enables an aerosol-type dispenser valve to be modified so as to work with a nonvolatile propellant such as a pressurized permanent gas. Such a kit of parts may contain a housing adapted at one end for fitting to an aerosol release valve (in place of the conventional dip tube) and adapted at its other end to receive and be fitted to the upper end of the removed dip tube (or an equivalent tube), wherein the housing includes a mixing chamber, first passage means for conveying pressurized gas into the mixing chamber, second passage means through which pressurised liquid can enter the mixing chamber, and at least one orifice between the mixing chamber and the aerosol release valve the dimensions of which are chosen to ensure that at least substantially choked flow results through the orifice.

Although the valve of the present invention is particularly suited for use with a single permanent gas such as nitrogen, other gases such as air, $CO_2$ or $N_xO$ may also be used either alone or in suitable mixtures. Such gases may even be used in combination with a liquefied propellant; however the proportion of the latter at atmospheric pressure should preferably not exceed about 10%.

The invention will now be described, by way of example, with reference to the accompanying drawings.

IN THE DRAWINGS

Figure 3A:
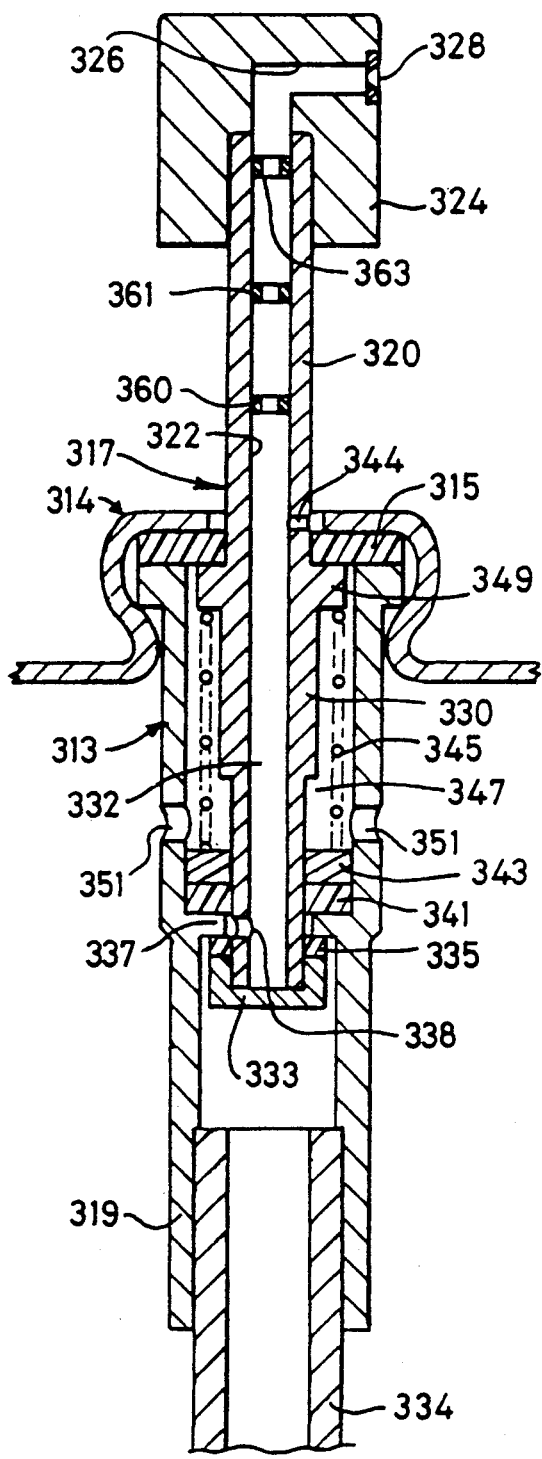
Figure 3B:
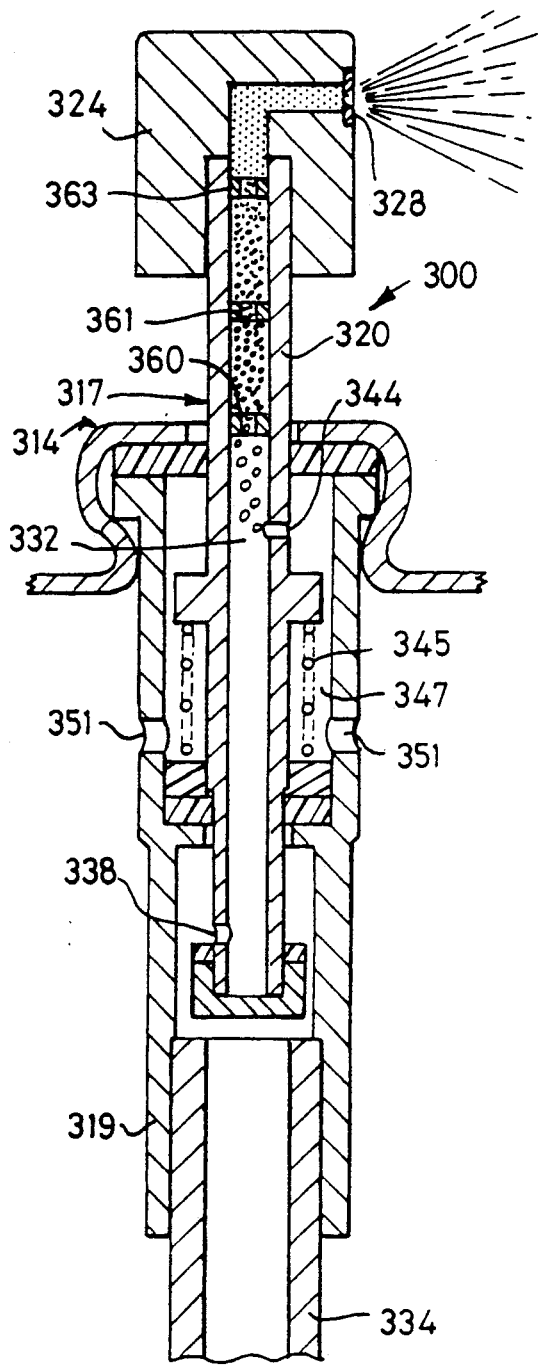
Figure 4:
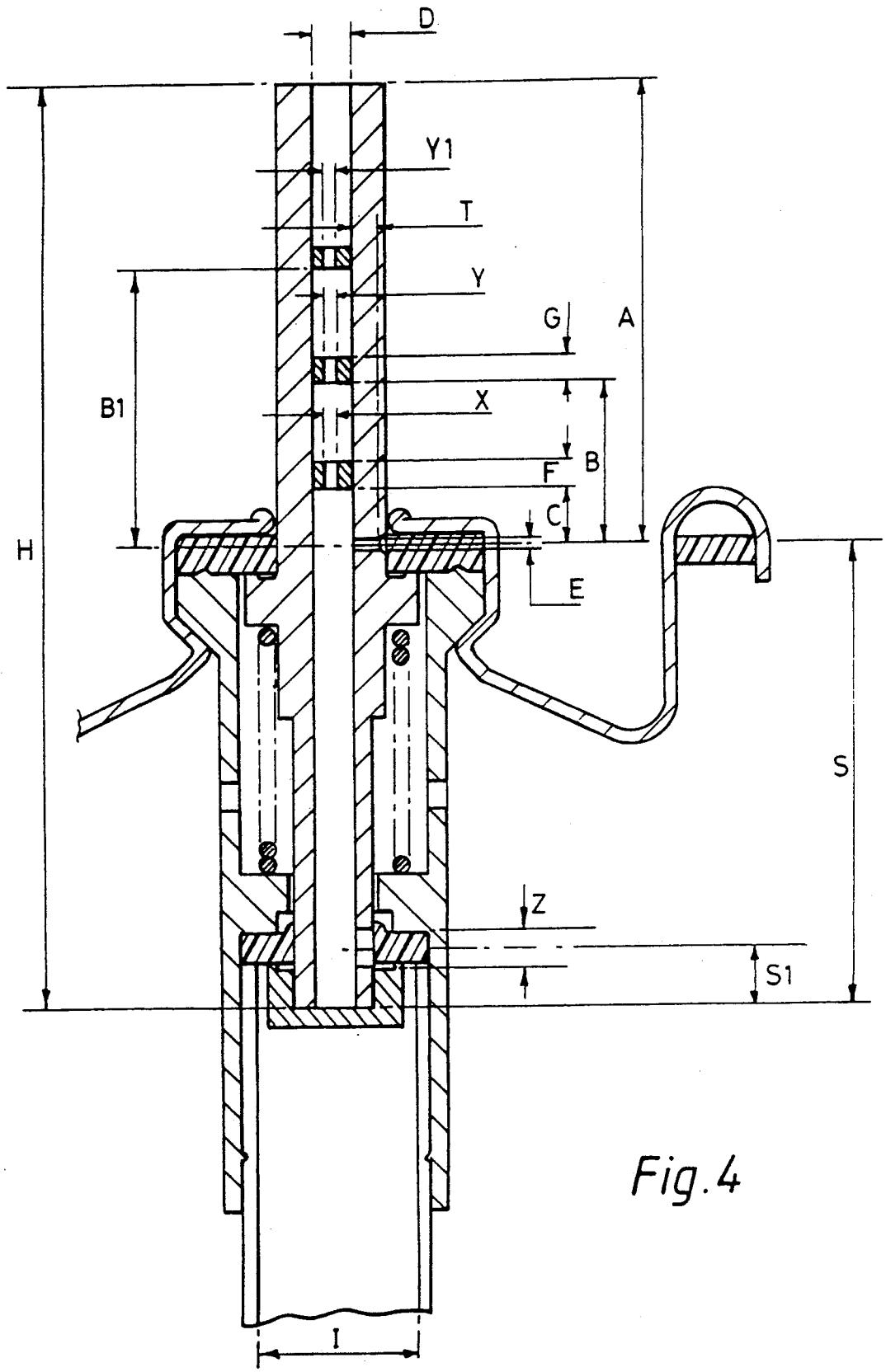

FIGS. 3a and 3b are schematic diagrams respectively showing an aerosol-style discharge valve in the closed and open positions, the valve being modified in accordance with the invention to enable a nonvolatile propellant gas to be used to force liquid through the valve and from thence through an exit nozzle; and FIG. 4 is a schematic diagram of a discharge valve in the closed position, being similar to the valve of FIG. 3a but including reference characters for the dimensions of certain parts having critical dimensions.

Figure 1:
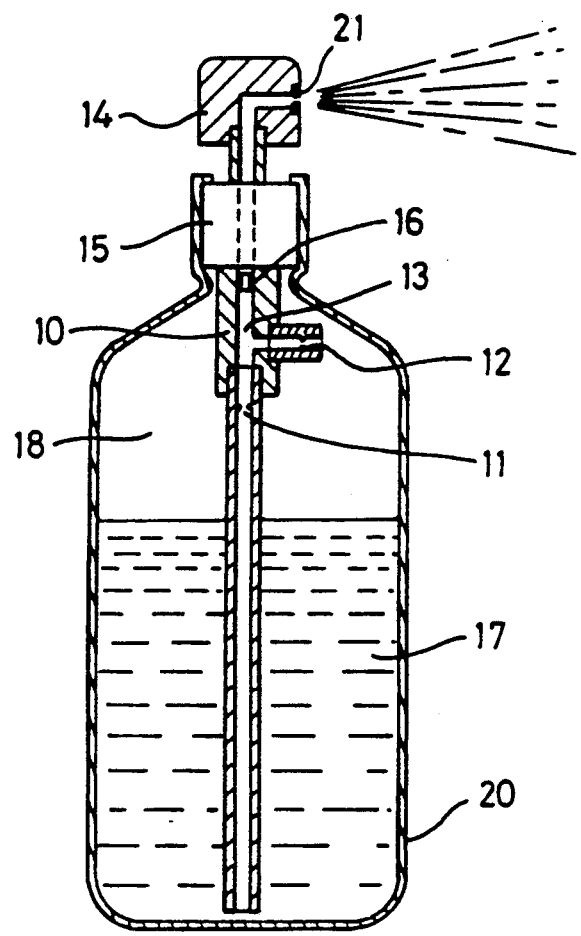
FIG. 1 is a schematic representation of a flow discharge control device fitted within a canister containing liquid for dispensing through an outlet nozzle.
Figure 2:
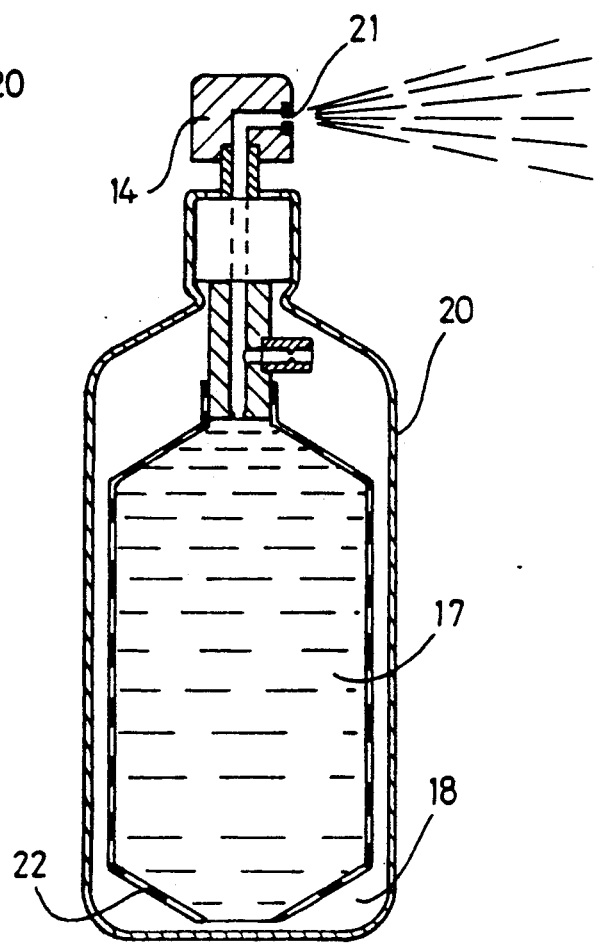
FIG. 2 is a schematic diagram of another flow discharge control device fitted to a similar canister but in which the liquid contents are separated from the propellant gas by a collapsible impervious sachet.
Figure 1A:
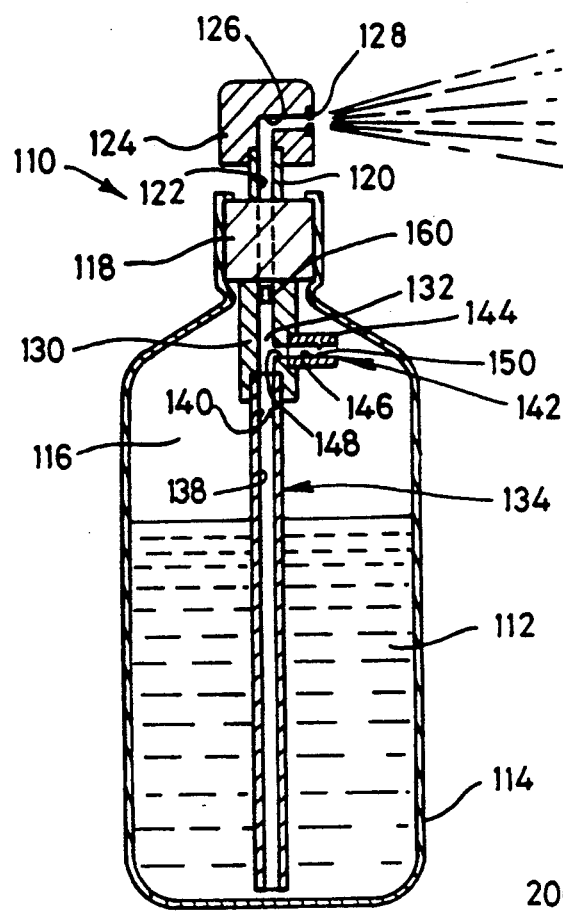
Figure 2A:
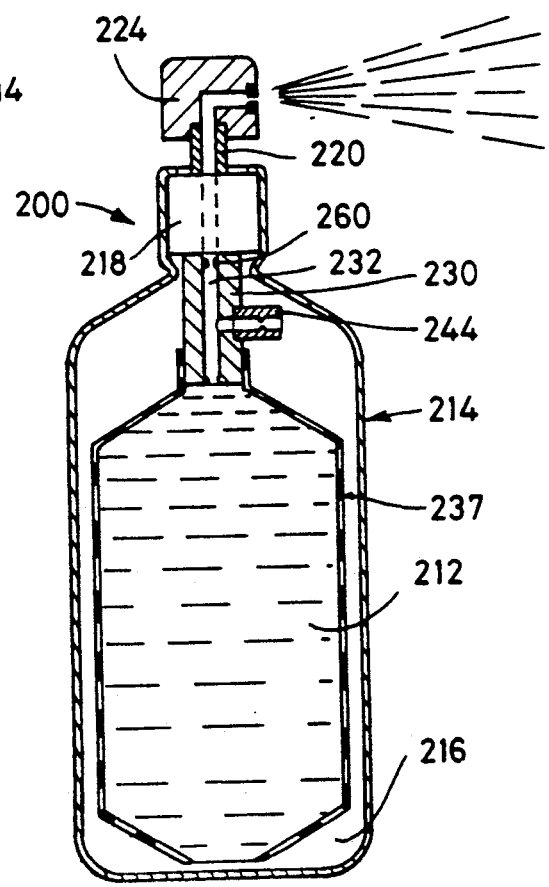
Figure 4A:
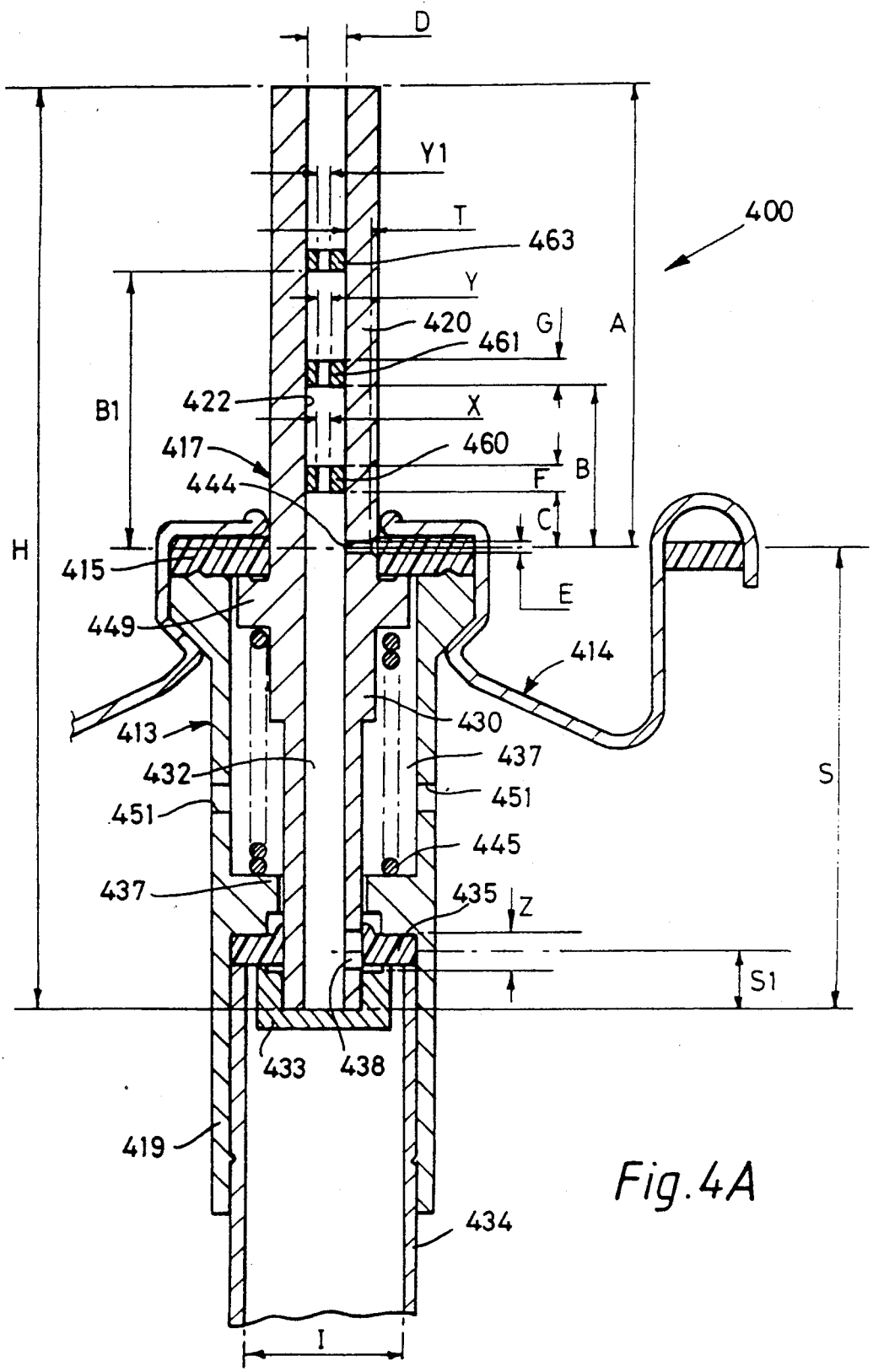
Figure 5:
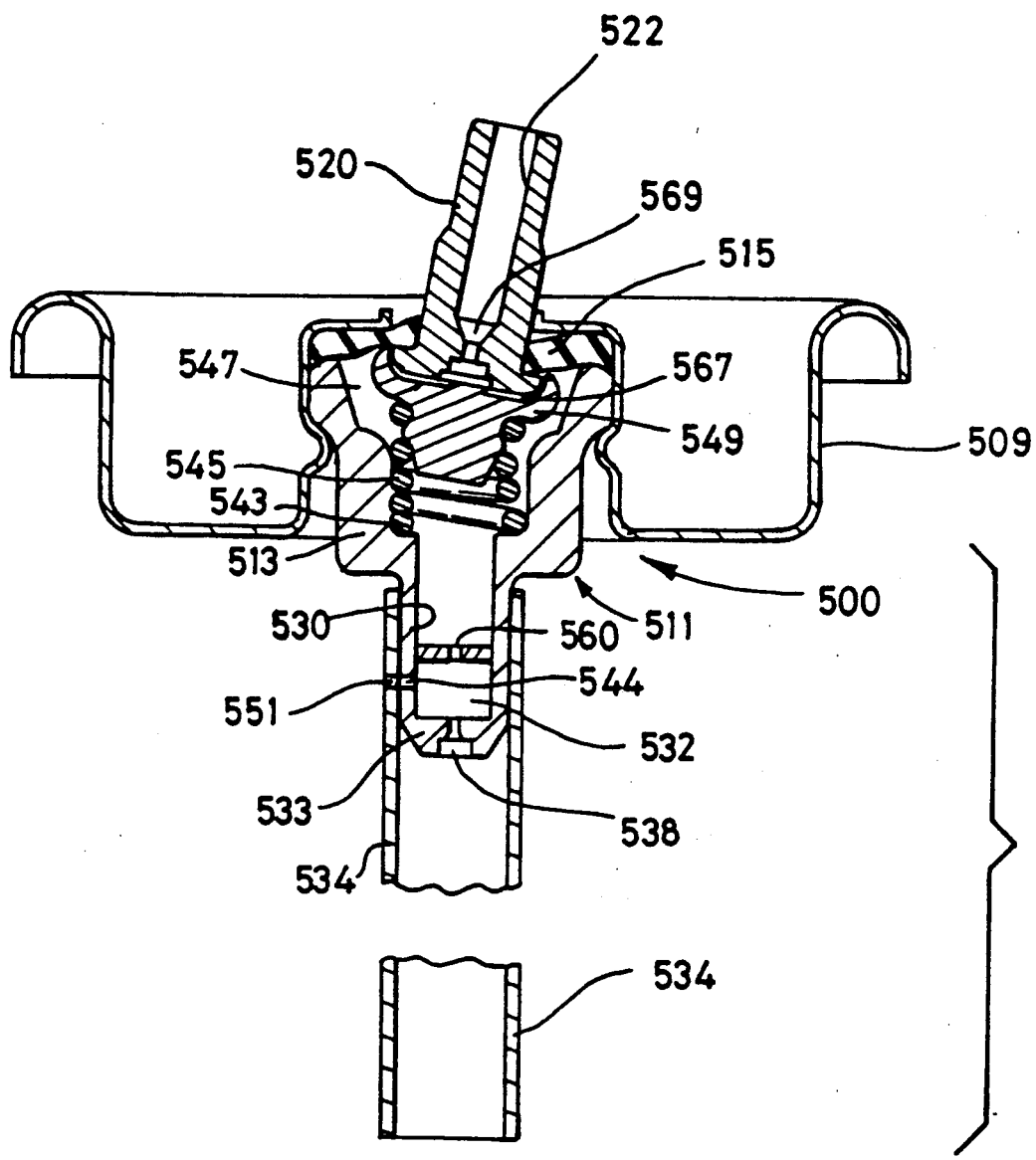
Figure 6:
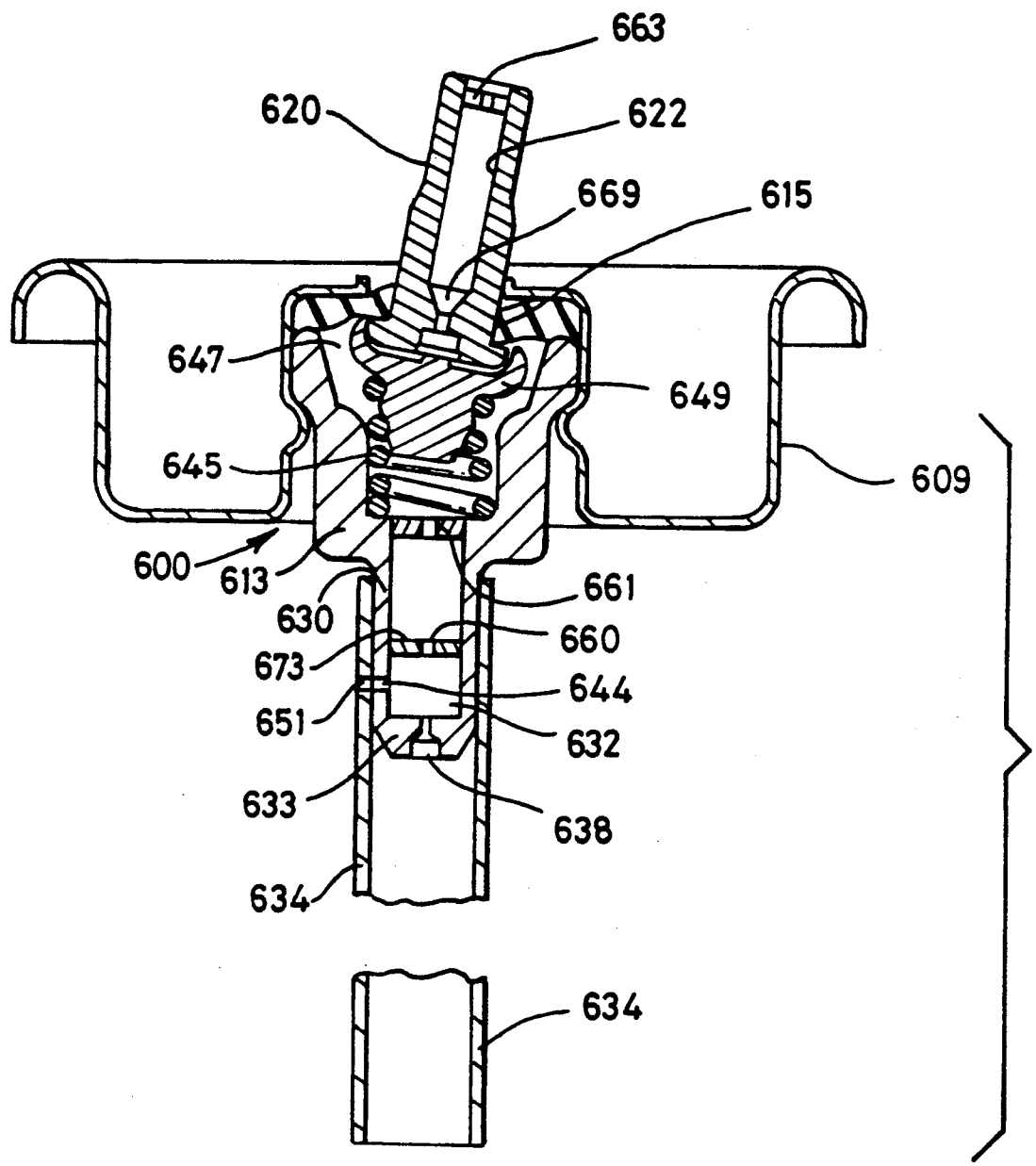
Figure 7:
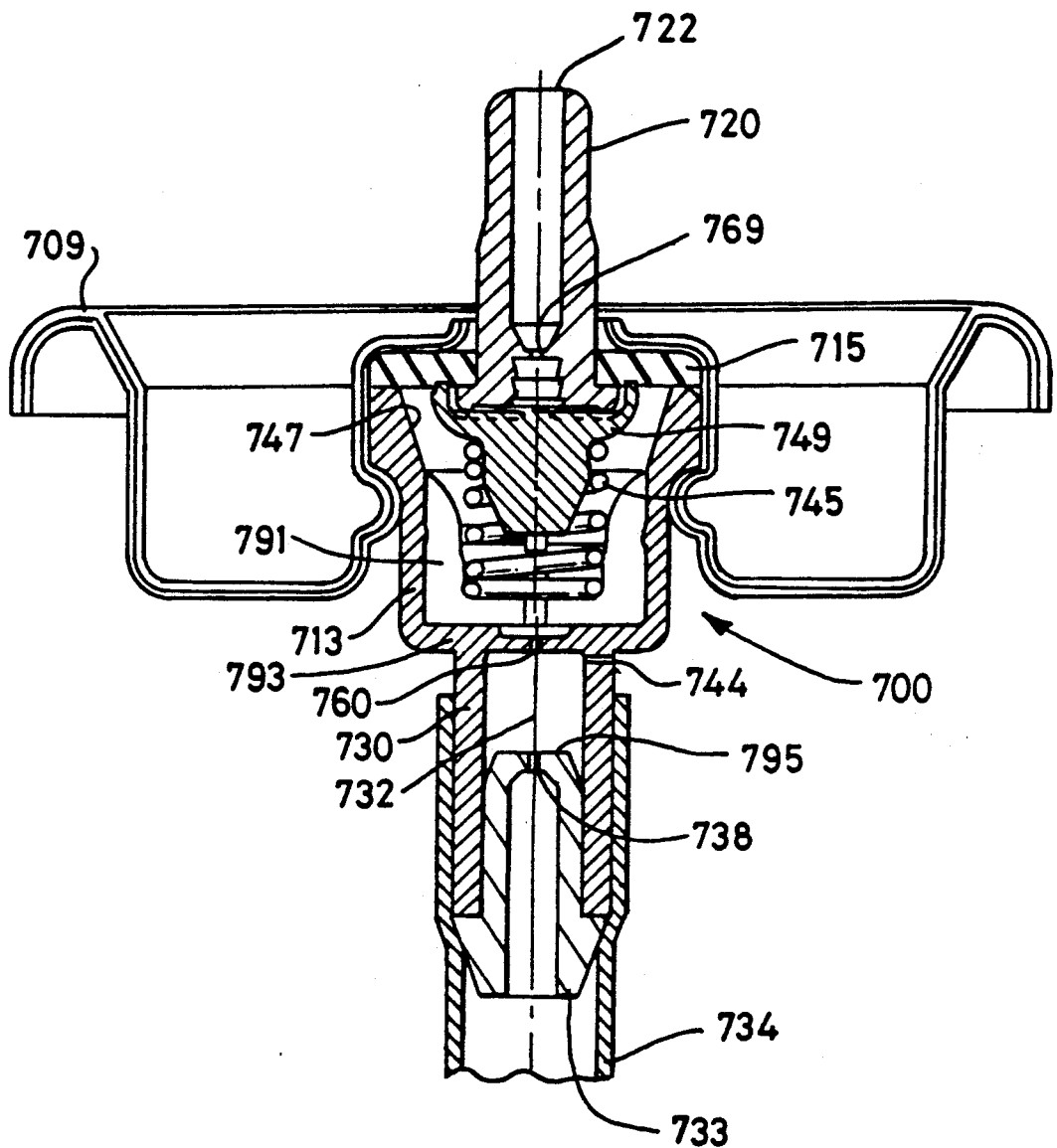

FIG. 1A is a simplified, schematic representation of a control device such as an aerosol discharge valve assembly of the present invention shown mounted to a canister or container containing liquid product and a permanent propellant gas and shown operating to dispense the product as a spray;

FIG. 2A is a simplified, schematic representation, similar to FIG. 1A, of another embodiment of the valve assembly;

FIGS. 3aA and 3bA are greatly enlarged, fragmentary, cross-sectional views showing a further embodiment of an aerosol discharge valve assembly in, respectively, closed and open positions;

FIGS. 4A, 5 and 6 are greatly enlarged, fragmentary, cross-sectional views each showing, respectively, further embodiments of the valve assembly in the closed position with the exit discharge nozzle being omitted from the figures for ease of illustration; and FIG. 7 is a greatly enlarged, fragmentary, cross-sectional view illustrating a generally conventional valve assembly, modified in accordance with the teachings of the present invention, in a closed position with the exit discharge nozzle being omitted from the figure for ease of illustration.

DETAILED DESCRIPTION OF THE DRAWINGS

Referring to FIG. 1, the device comprises a body 10 having two restrictions 11 and 12, one for restricting the passage of a liquid product to be dispensed and the other restrictor 12 for restricting the passage of gas into a central mixing chamber 13. This mixing chamber exits through a choke orifice or restrictor 16 designed to provide sufficient pressure drop to ensure violent turbulent mixing and choked flow in the mixture exiting from the mixing chamber 13. At a region downstream of the orifice 16 the flow becomes supersonic and shock waves are produced as the flow subsequently goes from supersonic to subsonic, producing vigorous break-up of gas particles to form a uniform foam. Additionally the orifice 16 reduces the pressure in the mixture, thus causing the gas to expand and increasing the ratio of gas to liquid.

The liquid 17 and gas 18, at an initial pressure P1, are contained within a closed vessel 20, typically a metal or plastics canister. When a control valve 15 is opened, liquid is forced up the tube 11 containing the liquid restrictor to enter the mixing chamber 13, and in turn gas can pass through the passage 12 containing the gas restrictor also to the mixing chamber. The mixture, now at a pressure P2, is forced through the mixing orifice 16 where the gas content of the mixture expands due to pressure drop, and the gas bubbles break-up to form a foam due to the vigorous turbulent mixing action caused by the sudden expansion from the restriction introduced by the orifice 16 and by passing through shock waves downstream of the orifice. Finally the mixture is forced through an exit nozzle 21 in a nozzle head 14 which constitutes the last restriction to the flow, and which is selected to give uniform spray characteristics.

The sizes and characteristics of the passages 11 and 12 are arranged so that the liquid/gas mixture passing through the mixing orifice 16 is of a ratio that will ensure that sufficient gas is left over when the liquid in the vessel 20 has been expended, and that during use full atomization and violent mixing takes place at the exit of the mixing orifice 16 so that the mixed flow is choked in the thermodynamic sense. In other words, the mixed flow is sonic at the exit from each restrictor (or the passage where the latter serves as the restrictor), becomes supersonic and returns to subsonic as it passes through a shock wave at a distance downstream from the exit.

FIG. 2 of the drawings shows an alternative form of construction in which the regulator exit nozzle 21 and control valve 15 are the same as in FIG. 1, as also is the canister 20. However, the liquid 17 is now contained within a collapsible sachet or bag 22 and the pressurized gas occupies the space 18 around the outside of the bag between the bag and the canister wall. The arrangement has the advantage that the liquid can be dispensed irrespective of the angle of the canister, whereas proper dispensing of the liquid and gas mixture will occur only if the canister is substantially upright when the FIG. 1 embodiment is used.

As an alternative to the sachet 22, a ball valve or similar type of check valve may be employed to prevent loss of gas if the canister is inverted.

FIGS. 3a and 3b show another flow control valve such as might be employed in a conventional aerosol dispenser which has been modified in accordance with the invention.

Referring first to FIG. 3a, a canister 24 is sealed to the upper end of a tubular housing 26 which contains an annular ledge intermediate its ends at 28 against which a seal 30 rests when the valve is in its upper closed position. The seal itself is secured around the upper end of a cup 32 which is fitted to and encloses the lower end of a central tube or valve stem 34.

Just above the seal 30 and in the wall of the tube 34 is a liquid orifice 36. In the closed position shown, the orifice 36 is separated by the seal 30 from the liquid product which is forced up a dip tube 38 under the action of a permanent gas propellant, such as nitrogen, contained above the liquid within the canister 24. If the tube 34 is depressed against a return spring 40, the liquid orifice 36 is exposed and liquid can enter the tube 34 through the orifice 36 from the upper end of the dip tube 38.

A gas orifice 42 is provided in the wall of the tube 34 remote from the orifice 36 and a second seal 44 serves to separate the orifice 42 from gas under pressure when the tube 34 is in its upper closed position as shown in FIG. 3a. The housing 26 includes apertures around its intermediate region of which two are shown at 46 and 48 to allow pressurized gas to enter a spring chamber 50 containing the spring 40.

When the central tube 34 is depressed, as shown in FIG. 3b, the orifice 42 communicates with the pressurized gas in the spring chamber 50 and the gas entrains and mixes with the liquid passing through the tube which has entered via orifice 36. An exit head 14 containing an exit nozzle 52 is fitted to the upper end of the tube 34 in known manner.

Between the mixing chamber 54 and the exit nozzle 52 are located three intermediate chokes or restrictors 56, 58 and 60. At least the upper restrictor 60 may, if desired, be formed integrally within the exit head 14. The restrictors 56 to 60 cause progressive expansion of the gas content of the mixture and progressively better atomization of the liquid content of the mixture, their size of being chosen to cause violent turbulent mixing.

Tests have shown that with the modified dispenser described, the volumetric ratio of gas to liquid exiting at atmospheric pressure will be less than about 5:1, in contrast to the far higher ratios of known aerosol dispensers using typical liquified propellants. With certain products, such as hair sprays or furniture polishes, the present ratio may be only 1:1, and with other products it is envisaged that the ratio may be even as low as 0.25:1.

The position of at least the lower restrictor 56 is so selected, relative to the position of the gas orifice 42, that the orifice 42 is located substantially nearer to the restrictor 56 than to the liquid orifice 36.

FIG. 4 shows a flow control valve, similar to the valve of FIG. 3a, with reference characters for the dimensions of major parts (such as the orifices and restrictors previously described above) whose sizes are important and may be critical. Table 1 below gives the dimensions of the identified parts expressed as a range of sizes which have been found in practice to work successfully. The table also indicates the preferred ranges of some critical diameters.

More than one gas orifice may be provided in the central tube (and likewise more than one liquid orifice); and it has been found that the preferred ratios of the cross-sectional areas of the liquid orifice(s) to the gas orifice(s) should be within the range of about 10:1 to 400:1.

It should be noted that three restrictors are shown in FIG. 4, and their spacings from the center of the gas restriction orifice (diameter E) are given in ascending order (upwards) as dimensions C, B and $B_1$ respectively. Where only two restrictors are required, the one indicated at $B_1$ is omitted. Where only one restrictor is required the one indicated at C only is retained.

TABLE 1

| DIMENSION | RANGE | COMMENTS |
|---|---|---|
| B | 8-25 mm | |
| B1 | 12-25 mm | |
| C | 0-25 mm Preferred size | less than 3.0 mm |
| D | 1-3 mm | |
| E | 0.1-0.25 mm | Preferred size 0.16 to 0.21 mm |
| F | 0.5-4 mm | |
| G | 0.5-4 mm | |
| I | 1-7 mm | Preferred size 3 to 5 mm |
| S | 10-30 mm | |
| S1 | 3-6 mm | |
| T | 0.5-2 mm | Length of gas bleed orifice (dia. E) |
| X, Y, Y1 | 0.1 × D–0.75 × D mm | Preferred size |

TABLE 1-continued

| DIMENSION | RANGE | COMMENTS |
|---|---|---|
| Z | 1-3 mm | 0.15 × D to 0.6 × D mm More than one liquid orifice can be used |

Table 2 below, gives examples of the dimensions of three arrangements of valves which have been tested. In Example 1 two restrictors were used (i.e. those having the spacings B and C), while in Examples 2 and 3 three and one restrictors were used respectively.

TABLE 2

| DIMENSION | Example 1 (2 restrictors) | Example 2 (3 restrictors) | Example 3 (1 restrictor) |
|---|---|---|---|
| A | 16.5 | 14.2 | 14.2 |
| B | 10.5 | 7.2 | — |
| B1 | — | 11.2 | — |
| C | 5.5 | 3.2 | 6.2 |
| D | 1.6 | 1.6 | 1.6 |
| E | 0.18 | 0.18 | 0.20 |
| F | 1.0 | 1.0 | — |
| G | 1.0 | 1.0 | 1.0 |
| H | 36.5 | 36.5 | 36.5 |
| I | 3.8 | 3.8 | 3.8 |
| S | 20.0 | 20.0 | 22.0 |
| S1 | 3.5 | 3.5 | 3.5 |
| T | 4.0 | 4.0 | 4.0 |
| X | 0.5 | 0.5 | 0.5 |
| Y | 0.8 | 0.8 | — |
| Y1 | — | 0.8 | — |
| Z | 1.6 | 1.6 | 1.6 |

All dimensions are expressed in millimeters.

In each example of Table 2 the spray nozzle used was a Precision Valve "Kosmos" of the Mechanical break-up CO2 type and of 0.35 mm (0.013 in) nozzle diameter. The liquid used was a 50% mixture of Propan-ol-2 with water, with the starting pressure in each example being 8 bar (gauge). The mean flow rates, which varied by 50% from start to finish, were as follows:

Example 1 : 1 ml/s
Example 2 : 0.85 ml/s
Example 3 : 1.3 ml/s

For purposes of further explanation of the details of FIGS. 1, 2, 3a, 3b and 4, the following descriptions of those Figures as FIGS. 1A, 2A, 3aA, 3bA and 4A will now be presented.

The apparatus of FIG. 1A may be characterized as an aerosol discharge valve assembly 110 for regulating the flow of a liquid product 112 from an aerosol container 114 which is pressurized substantially by a permanent propellant gas 116, such as nitrogen.

The valve assembly 110 includes a control valve 118 which is sealingly mounted in the upper end of the container 114. A tubular member 120 projects upwardly and outwardly of the container 114 and defines an internal discharge passage 122. An exit nozzle 124 is mounted to the upper end of the tubular member 120. The exit nozzle 124 may be alternatively described as a valve button or actuator button, and it defines at least one internal passage 126 communicating with the tubular member passage 122. The actuator button passage 126 communicates with a discharge port which, in the embodiment illustrated in FIG. 1A, is defined by an insert nozzle member 128.

The control valve 118 may be of a conventional or special configuration for regulating flow through the control valve via suitable flow passage means and valve member means (not illustrated in FIG. 1A). The control valve 118 is operable between open and closed positions for controlling the flow through the control valve into the tubular member passage 122.

A tubular member 130 projects downwardly in the container 114 from the control valve 118 and defines an internal mixing chamber or mixing region 132. In the first embodiment illustrated in FIG. 1A, the assembly 110 further includes a first passage means, in the form of a tube 134, that is connected to the tubular member 130 and that defines an internal passage 138. The upper end of the tube 134, which may be further described as a "dip tube", is received in the lower end of the downwardly projecting tubular member 130, and the dip tube internal passage 138 communicates with the mixing chamber or region 132. In some applications, the dip tube 134 can be provided with a reduced-diameter flow restriction as at 140. The dip tube 134 extends down through the liquid product and has an open lower end adjacent the container bottom.

A second passage means, in the form of a tube 144, defines an internal passage 146 and is mounted to the side of the downwardly projecting tubular member 130 to communicate through an orifice 148 with the mixing region 132. In some applications, the tube 144 defines a reduced-diameter flow restriction 150 in the internal passage 146.

Depending upon the specific construction of the control valve 118, the control valve 118 can be operated to open by pressing the exit nozzle 124 downwardly, or laterally if the valve is a tilt-action valve. When the control valve 118 is open, the permanent propellant gas 116 in the aerosol container 114 forces the liquid product 112 upwardly through the dip tube 134 into the mixing chamber 132. At the same time, the permanent propellant gas 116 passes through the tube 144 into the mixing chamber 132.

At least one intermediate choke restrictor 160 is provided between the mixing region 132 and the exit nozzle 124. According to one characterization of the invention, the size of the choke restrictor 160, relative to the sizes of the other components, is selected to provide at least substantially sonic velocity choked flow through the choke restrictor 160 at above a selected minimum internal gas pressure. Then, as the mixed liquid product and propellant gas pass through the choke restrictor 160, the liquid product 116, in response to changes from subsonic velocity flow to sonic velocity flow and the return to subsonic velocity flow, breaks up into fine liquid droplets to produce a highly dispersed foam liquid product internally of the valve assembly, i.e., upstream of the insert nozzle member 128.

The creation of a fine foam with as little propellant gas as possible is a feature of the invention. It is believed that the mixing is aided by expansion or shock waves set up when the flow returns from sonic or supersonic velocity, as it leaves the mixing restrictor, to subsonic velocity a small distance downstream of the restrictor 160.

The velocities needed to achieve sonic flow in a gas/liquid mixture are extremely low (as little as 20 m/s) compared to sonic velocities in pure gas (typically 340 m/s) or liquid (typically 1300 m/s). The flow is choked, i.e., is choked flow, in the thermodynamic sense in the restrictor. It is believed that, as the flow leaves the mixing restrictor and expands further, it can either become supersonic for a short distance before returning via shock waves to a subsonic state or it can expand in an uncontrolled fashion via expansion waves to a lower pressure. Shock waves and expansion waves are effectively large pressure and density changes over short distances which cause large shearing stresses on the fluid which in turn causes violent break up of the foam into an even finer foam.

Although the precise phenomena are not necessarily completely understood, it is believed that the above-described process and apparatus produces a vigorous break-up of the gas and liquid to create a substantially uniform foamed product immediately upstream of the insert nozzle member. Additionally, it is believed that the restrictor 160 reduces the mixture pressure so as to cause the gas to expand and increase the ratio of gas to liquid.

Additional flow restrictors may be incorporated, as will be explained in detail hereinafter. It will be appreciated, however, that with the embodiment illustrated in FIG. 1A, the exit nozzle 124 constitutes a last restriction, but not a mixing restrictor, to the flow, and the nozzle element 128 is selected according to known principles to help enhance or control the spray characteristics, such as uniformity, spray angle, etc.

Further, the interior surfaces and passages defining the flow pathway from the mixing chamber 132 out to the nozzle element 128 are selected and arranged so that the ratio of liquid to gas in the mixture passing through the restrictor 160 will ensure that sufficient permanent propellant gas remains when the liquid product in the container 114 has been substantially expended, and that during use, sufficient atomization and violent mixing takes place.

The term choked flow in this context means that the flow through a restrictor or nozzle is sonic. This phenomena of choked liquid/gas mixed flow is described in, inter alia, an article by J. F. Muir et al., entitled "Compressible Flow of an Air/Water Mixture Through a Vertical Two-Dimensional Converging Diverging Nozzle", published in the proceedings of the 1963 Heat Transfer and Fluid Mechanics Institute, edited by A. Roshko et al., and in an article by L. van Wijngaarden, entitled "One-Dimensional Flow of Liquid Containing Small Gas Bubbles", 1972.

In the embodiment illustrated in FIG. 1A, the flow of the pressurized liquid product 112 is preferably controlled by means of the orifice or restriction 140 in the dip tube 134. Similarly, the flow rate of the propellant gas 116 is preferably controlled by means of the small orifice or restriction 150 in the tube 144.

It is contemplated that typical commercial embodiments of the assembly 110 will have a mixing region 132 defined by a chamber having a generally cylindrical interior. In a modification, the mixing region 132 may be formed in a chamber as part of an extension of the dip tube 134. In such a case, the gas propellant, which is shown in FIG. 1A as being introduced through the tube 144, would instead be introduced directly through the wall of the dip tube into the mixing region. Further, both the passage for the gas/liquid product mixture and the passage for the propellant gas alone may be defined by closed tubes or structures which are porous. In some cases it may be advantageous to replace both the dip tube and restrictor 140 by a single capillary tube which would both deliver liquid to the mixing region and create suffcient controlling means.

Preferably, the restrictor 160 is in the range of about 10% to about 60% of the diameter of the mixing region 132 when the mixing region 132 has a cylindrical configuration. In contemplated commercial applications, the restrictor 160 is expected to have a diameter ranging from about 0.2 mm to about 1.2 mm. Further, in some applications, the restrictor 160 may be provided in the form of a capillary tube.

In operation, the exit nozzle orifice or nozzle element 128 is presented with a foaming mixture similar to that normally produced by liquefied gas propellants as they start to boil or evaporate upstream of the exit nozzle.

The form and characteristics of the final spray at the exit orifice are found to remain essentially constant throughout the discharge of the liquid product. This results from ensuring good mixing in the mixing chamber or region 132, and by ensuring that the residual pressure (which remains across the (or each) intermediate orifice restrictor 160 when the liquid content is about to become exhausted) is still sufficiently high to produce at least substantially choked flow through the intermediate restrictor (or each intermediate restrictor) and thereby produce a shock or expansion wave after each restrictor.

Further, in many applications, the propellant gas passage means (e.g., tube 144 and orifice 148 in FIG. 1A) should be very close to the restrictor 160, i.e., the gas passage means should be immediately upstream of the restrictor.

The critical pressure ratio needed to achieve choking in any liquid/gas mixture is, in general, a function of pressure and volumetric mixture proportions and can, if necessary, be determined by experiment. A minimum sonic velocity (and hence pressure ratio) is usually achieved at mixtures of approximately 50% gas and 50% liquid.

In accordance with another aspect of the present invention, the size of the passage means are so selected in relation to the size of the intermediate restrictor 160 that the volumetric ratio of gas to liquid dispensed at atmospheric pressure is less than approximately 5:1.

According to a further aspect of the present invention, the novel control valve assembly can be fabricated by modifying some conventional aerosol container components. To this end, a kit of parts can be provided which enables an aerosol-type dispenser valve to be modified so as to work with a non-volatile propellant gas, such as a pressurized permanent gas. Such a kit of parts may contain a housing adapted at one end for fitting to an aerosol release or control valve (in place of the conventional dip tube) and adapted at its other end to receive and be fitted to the upper end of the removed dip tube (or an equivalent tube). The housing would include a first passage means through which pressurized liquid can enter the mixing chamber, a second passage means for conveying pressurized gas into the mixing chamber, and at least one choked restrictor between the mixing chamber and the aerosol valve. The relative dimensions of the restrictor and passage means are selected to ensure that the volumetric ratio of gas to liquid dispensed at atmospheric pressure is less than approximately 5:1 and/or that at least substantially choked flow results through the restrictor.

Although the valve of the present invention is particularly suited for use with a single permanent gas such as nitrogen, other gases such as air, $CO_2$ or $N_xO$ may also be used, either alone or in suitable mixtures. Such gases may even be used in combination with a minor amount of a liquefied propellant; however, the proportion of the latter at atmospheric pressure should preferably not exceed about 10%.

Another embodiment of the discharge valve assembly of the present invention is illustrated in FIG. 2A and is designated generally therein by reference numeral 200. The assembly 200 includes a container 214 which may be substantially identical to the container 114 of the embodiment discussed above with reference to FIG. 1A. The second embodiment of the assembly 200 may incorporate other components identical to the first embodiment, and such components may include a control valve 218, an upwardly projecting tubular member 220, an exit nozzle 224, and a downwardly projecting tubular member 230 defining a mixing or receiving chamber or region 232 and incorporating a restrictor 260. The assembly 200 also includes a passage means 244 mounted to the tubular member 230 for communicating with the mixing region 232.

However, unlike the embodiment of FIG. 1A, the assembly 200 does not have a dip tube 134. Rather, the assembly 200 employs a collapsible bag or bladder 237 which has an open end sealingly mounted to the downwardly projecting tubular member 230. The bladder 237 contains the liquid product 212, but does not occupy the entire interior volume of the container 214. The volume in the container 214 around the bladder 237 is pressurized with the permanent propellant gas 216.

The use of the bladder 237 permits the liquid product 212 to be discharged when the container 214 is at any angle. This is in contrast with the first embodiment illustrated in FIG. 1A wherein the container 114 must be maintained in the generally upright, vertical orientation to permit the liquid product 112 to be forced up the dip tube 134 by the permanent propellant gas 116.

Modifications to the assembly of the present invention which permit operation with the container inverted may include other alternatives, such as the use of a ball valve or other similar type of check valve (not illustrated).

Another embodiment of the discharge valve assembly of the present invention is illustrated in FIGS. 3aA and 3bA and is designated therein generally by reference numeral 300. The assembly 300 includes a tubular housing 313 which is mounted at its upper end to a container 314. An annular seal member 315 at the top of the tubular housing 313 provides a leak-tight connection. The lower end of the housing 313 includes a cylindrical portion 319 in which is mounted the upper end of a dip tube 334.

A central tube 317 is disposed within the housing 313 for vertical movement within the housing 313. The central tube 317 includes a tubular member 320 projecting upwardly and outwardly of the container 314. The upwardly projecting tubular member 320 defines an interior passage 322 and is surmounted by an exit nozzle 324 having internal passages 326 for communicating with the passageway 322 and with a discharge orifice 328. The central tube 317 includes a tubular member 330 projecting downwardly into the container 314. The interior of the tubular member 330 defines a mixing region or chamber 332.

The bottom of the tube downwardly projecting tubular member 330 is closed with an end cap 333. The end cap 333 has a peripheral, cylindrical wall which supports an annular seal 335 that engages the exterior cylindrical surface of the downwardly projecting tubular member 330. The tubular housing 313 includes an inwardly extending, annular flange 337 which is adapted to engage the upper surface of the seal 335 when the central tube 317 is in the elevated, closed position illustrated in FIG. 3aA.

An annular seal member 341 is supported by the upper surface of the housing flange 337 and forms a sliding seal engagement with the exterior cylindrical surface of the downwardly projecting tubular member 330.

A support ring 343 is disposed on top of the seal 341 and is engaged by the end of a helical compression spring 345 which is disposed within a chamber 347 defined between the downwardly projecting tubular member 330 and the housing 313. The upper end of the spring 345 engages an annular flange 349 defined on the central tube 317 at the upper end of the downwardly projecting tubular member 330. The spring 345 normally biases the central tube 317 upwardly to the elevated, closed position (illustrated in FIG. 3aA) wherein the upper surface of the flange 349 engages the lower surface of the seal 315 and wherein the lower surface of the flange 337 engages the seal 335.

The flange 349 and the seal 335 function as a valve member of a control valve which is operable between the closed position illustrated in FIG. 3aA and the open position illustrated in FIG. 3bA for controlling flow through the valve and through the tubular members 330 and 320 as explained hereinafter.

The lower tubular member 330 defines an orifice or passage means 338 for accommodating the flow of liquid product from the dip tube 234 into the mixing region 332 when the central tube 317 of the central tube 317 is in a lower, open position as illustrated in FIG. 3bA. The assembly is moved to the open position by pressing downwardly on the exit nozzle 324.

The upper tubular member 320 defines a second passage means or orifice 344 which, when the assembly is in the elevated, closed position illustrated in FIG. 3aA, is located above the seal 315. When the assembly is actuated to the open position, as illustrated in FIG. 3bA, the second passage means 344 is positioned below the seal 315 and communicates with the interior volume of the spring chamber 347 as illustrated in FIG. 3bA.

The tubular housing 313 defines a plurality of apertures 351 which communicate between the spring chamber 347 and the volume of the container surrounding the tubular housing 313. The permanent propellant gas occupies the volume of the container interior above the liquid product and passes through the apertures 351 to also pressurize the spring chamber 347 in both the open and closed positions of the assembly. Thus, when the assembly is in the open position as illustrated in FIG. 3bA, the permanent propellant gas passes from the spring chamber 347 through the second passage means 344 into the mixing region 332 to mix with the liquid product that is being forced upwardly inside the central tube 317.

In this embodiment, three intermediate choke restrictors, 360, 361, and 363, are provided on the interior of the upwardly projecting tubular member 320. If desired, one of these restrictors may be formed integrally with the exit nozzle 324. Preferably, the position of at least the lower restrictor 360 relative to the position of the gas orifice 344 is selected so that the gas orifice 344 is located substantially nearer to the restrictor 360 than to the liquid orifice 338.

The restrictors 360, 361, and 363 cause progressive expansion of the gas content of the mixture and progressively better atomization of the liquid content of the mixture. The size of the restrictors is selected to cause violent, turbulent mixing. As discussed above with respect to the embodiment illustrated in FIG. 1A, one aspect of the invention may be characterized as providing at least one of the restrictors with a size relative to the other components so as to create substantially sonic velocity choked flow at and above a selected minimum internal pressure. According to another characterization, the sizes and locations of the choke restrictors, mixing region, first passage means, and second passage means are such that the volumetric ratio of the gas to liquid product dispensed at atmospheric pressure is less than approximately 5:1. Tests have shown that the volumetric ratio at atmospheric pressure is less than this in contrast to higher ratios of known aerosol dispensers using typical liquefied gas propellants. With products, such as hair sprays or furniture polishes, the volumetric ratio of gas to liquid at atmospheric pressure may be only about 1:1, and with other products it is contemplated that the ratio may be even as low as 0.25:1.

Another embodiment of the valve assembly of the present invention is illustrated in FIG. 4A and is designated generally therein by reference numeral 400. The assembly 400 is similar, and functions in a similar manner, to the assembly 300 described above with reference to FIGS. 3aA and 3bA. The elements of the assembly 400 that are identical or functionally analogous to those of the assembly 300 are designated by reference numerals in the 400 series with the last two digits being identical to those used for the last two digits of the reference numerals of assembly 300.

The assembly 400 is different in some respects from assembly 300. In particular, the lower seal 435 does not move with the lower tubular member 430 but, rather, is retained in a fixed position against the housing flange 437 by the upper end of the dip tube 434. Further, the first passage 438, which conveys the flow of liquid product into the mixing region 432, is positioned in the lower tubular member 430 so that the passage 438 is at about the same elevation as the seal 435. When the central tube 417 is moved downwardly, the first passage 438 is exposed to the inside of the dip tube 434 below the seal 435.

Further, the second passage means 444 is located so that, when the central tube 417 is in the closed position as illustrated, the second passage means 444 is adjacent, rather than above, the seal 415 so as to eliminate the possibility of foreign matter entering the central tube 417 from the exterior ambient atmosphere.

Table 1 above gives the dimensions of the identified elements expressed as a range of sizes which have been found in practice to work successfully. Table 1 also indicates the preferred ranges of some of the diameters.

The locations of the restrictors 460, 461, and 463 are listed in Table 1 in ascending order of the distance of the restrictor from the center line of the gas orifice 444 as dimensions C, B, and $B_1$, respectively. Where only two restrictors are employed, the uppermost restrictor 463 (dimension $B_1$) would be omitted. Where only one restrictor is employed, that one restrictor would be the lowermost restrictor (i.e., restrictor 460). The dimensions of all three restrictors may be the same.

The assembly 400 may be modified. For example, more than one gas passage 444 may be provided in the central tube 417, and similarly, more than one liquid product passage 438 may be provided. The preferred ratio of the cross-sectional areas of the liquid passage (or passages) to the gas passage (or passages) should be within a range of about 10:1 to about 400:1.

Table 2 above gives examples of the dimensions of three arrangements of valve assemblies which have been tested. In Example 1 two restrictors were used, and those were restrictors 460 and 461 as illustrated in FIG. 4A. In Example 2, all three restrictors, restrictors 460, 461, and 463, were used. In Example 3, only restrictor, restrictor 460, was used.

The assembly used in each example in Table 2 employed a mechanical break-up $CO_2$ type of spray nozzle sold under the trade name "Kosmos" in the United Kingdom by Precision Valve. The liquid product employed in the examples was a 50% mixture of propan-ol-2 with water, and the initial starting pressure in the container in each example was 8 bar (gauge). The mean flow rates, which varied by 50% from start to finish, were as follows: Example 1, 1 ml./s.; Example 2, 0.85 ml./s.; and Example 3, 1.3 ml./s.

A further embodiment of an aerosol valve assembly of the present invention is illustrated in FIG. 5 and is designated therein generally by the reference numeral 500. The assembly is adapted to be mounted to a metal cup 509 which is in turn mounted in sealing engagement over the open top of a conventional aerosol container (not illustrated) which contains the liquid product pressurized by a permanent propellant gas.

The assembly 500 includes a control valve 511 which includes a valve body or housing 513 mounted to the container cup 509. An annular gasket 515 is compressed between the top of the housing 513 and the cup 509 to provide a leak-tight seal.

The interior of the valve body or housing 513 defines a spring chamber 547 in which is disposed a helical compression spring 545. The spring 545 is positioned with its bottom end on an inwardly extending annular flange 543, and the upper end of the spring 545 engages a valve member 549 which is movable, against the force of the spring 545, downwardly or angularly as illustrated in FIG. 5 so as to disengage at least a portion of the top of the valve member 549 from the underside of the gasket 515.

The valve member 549 is of a conventional type having flow passageways 567 communicating between the peripheral upper surface of the valve member and a central orifice or passage 569 in an upwardly projecting tubular member or valve stem 520. The tubular member or stem 520 is normally surmounted with an exit nozzle or actuator button (not illustrated) that may be of a conventional or special type, including the type employed with the embodiments as illustrated in FIGS. 1, 2, 3a and 3b.

The valve stem 520 defines a valve stem passage 522 through which a mixture of the propellant gas and liquid product can flow out of the container, and the orifice 569 restricts the flow of the mixture through the valve stem passage 522.

The valve body 513 includes a tail section or downwardly projecting tubular member 530 that defines at least part of a mixing region or chamber 532 and that is adapted to be connected with the upper open end of a dip tube 534. In FIG. 5, the tail section has a first cross wall 533 which defines a first passage means or passage 538 communicating with the interior of the dip tube 534.

The cylindrical side wall of the tail piece 530 defines part of a second passage means or passage 544, and the adjacent wall of the surrounding dip tube 534 defines an orifice 551 which is aligned with, and communicates with, the passage 544 for accommodating the flow of the permanent propellant gas from the container into the mixing region 532.

The tail piece 530 includes an orifice 570 defined by a second cross wall 560 which functions as a choke restrictor.

When the valve assembly 500 is actuated, the liquid product travels up the dip tube 534, and, due to viscous effects, energy is lost. This is manifested as a pressure loss which causes the mixing region to have a pressure less than that of the container. Further, the permanent propellant gas flows through the aligned passages 551 and 544 into the mixing region 532.

Owing to the turbulent nature of the flow near the choke restrictor 560, some amount of mixing of the two fluids takes place before they enter the restrictor orifice. As the fluids exit the restrictor 560, violent mixing leads to the formation of a fine foam which travels through the remaining valve passageways, ultimately to be discharged through the exit nozzle. The restriction formed in the valve member passageways 567 further helps to sustain the spray foam as does the stem orifice 569.

A modification of the embodiment illustrated in FIG. 5 is shown in FIG. 6. Elements of the FIG. 6 embodiment which are identical or functionally analogous to the elements of the embodiment illustrated in FIG. 5 are designated by reference numerals in the 500 series with the last two digits being identical to the last two digits of the corresponding element reference numerals in FIG. 5.

The embodiment of FIG. 6 differs from the embodiment of FIG. 5 in that additional choke flow restrictors have been incorporated. In particular, a second restrictor 661 is included in the body tail section 630 downstream of the first intermediate restrictor 660 and immediately below the bottom end of the spring 645. Further, a third restrictor 663 is provided in the valve stem passage 622. In some applications, either the second restrictor 661, or both the second restrictor 661 and the third restrictor 663, may advantageously be employed with certain liquid products, such as some water based solutions, which are difficult to spray with the desired degree of atomization.

The locations of the first intermediate restrictor 660 and the second restrictor 661 relative to one another and relative to the gas passage 644 should be optimized to eliminate bubble or slug flow which would result in poor atomization at the discharge of the exit nozzle. Proper optimization for the pressures, liquid product, and propellant gas employed is believed to prevent an unstable regime which may be caused by gas bubbles coalescing or combining into larger bubbles in the spring volume (547 or 647), which can result in the undesired slug flow.

In the embodiments illustrated in FIGS. 5 and 6, a fine foam is produced in the mixing region located in the valve tail piece just before the mixture enters the large spring volume in the valve body. The gas passage (e.g., 544 or 644) is located in the valve tail piece upstream of, but very close to, the first restrictor (e.g., 560 or 660).

The restrictor (e.g., 560 or 660) is sized and located relative to the liquid passage and gas passage. The ratio of the volume of gas to the volume of liquid is controlled by the relative restriction on the flow of gas through the gas passage and on the flow of liquid through the dip tube and tail piece. Under some conditions, a restrictor is required in the tail piece prior to the gas passage to further reduce the pressure of the liquid entering the mixing region. The passage sizes are dependent on the physical properties of the liquid product, the desired product flow rate and particle size, the initial fill ratio of product volume to total container volume, and the initial container fill pressure.

A feature of the present invention is that only relatively small amounts of propellant gas are used to create a fine foam and good atomization. The ratio of gas to liquid after expansion to atmospheric pressure is less than 5:1. The ratio is typically 1:1 for conventional hair sprays with initial product flow rates of under 0.6 g/s, fill ratios of 60%, and fill pressures of 8 to 10 bars gauge.

In the embodiments of FIGS. 5 and 6, at least one mixing restrictor is positioned between the gas passage and body spring volume. Preferably, the restrictor orifice diameter is in the range of 10% to 60% of the main passage diameter that defines the mixing region and, typically, the restrictor orifice will have a cross-sectional area of between 0.03 to 0.8 square mm (equivalent to a diameter of about 0.2 mm to 1.0 mm if the orifice has a circular cross section).

The position of the first intermediate mixing restrictor relative to the gas passage depends on the required product flow rate, the physical properties of the product, the required fill ratio, and the initial fill pressure. The vertical distance from the bottom of the restrictor to the centerline of the gas passage is between 0.0 and 3.0 mm (less than 3.0 mm) for typical hair sprays with initial product flow rates of under 0.6 g/s, fill ratios of 60%, and fill pressures of 8 to 10 bars gauge.

The ratio of the cross-sectional area of the restricted liquid passage (538 or 638) to the restricted gas passage (544 or 644) is of importance since this ratio is instrumental in controlling the ratio of gas to liquid in the foam, and this ratio ranges between 8:1 to 400:1. The ratio is typically between 8:1 and 40:1 for hair sprays in containers with fill ratios of 60% and an 8 to 10 bar gauge fill pressure at a product flow rate of 0.5 g/s.

The relative sizes and positions of the liquid and gas passages and of the mixing restrictors determine whether or not a fine foam is produced. If the sizes and positions are not proper, smooth atomization is impossible. For instance, if the ratio of gas to liquid is too great for the size of mixing restrictor employed, then slug flow may result. If the ratio is too small, then bubble flow may result (essentially liquid flow with small gas bubbles). Both of these flow regimes result in ragged and unstable atomization.

By mixing the gas and liquid, and then producing a fine foam before the mixture enters the body spring volume, the flow is stabilized. It is believed that the flow stabilizes because the foam remains stable as it passes through the body spring volume. If the mixing process is not efficient and a poor foam is created, then this foam can separate into its two components in the spring volume and lead to slug flow.

In some cases further mixing restrictors may be required, either in the body tail piece or in the valve stem. For instance, with materials that are difficult to foam, the foam can separate into its constituent components in the spring body volume because the velocity drops sufficiently to provide a longer travel time during which the foam can collapse. If this collapse is only partial, the foam can be re-established in the stem cross holes or in the gap between the spring cup and the stem flange. It may sometimes be necessary to provide a restrictor in the stem to re-establish the foam. In yet other cases, a second mixing restrictor may be desirable in the body tail piece (e.g., for liquids which do not easily foam and where the first mixing restrictor does not foam the mixture).

Another feature of the invention is that for equivalent actuators, lower product flow rates can be achieved than are possible with conventional valve assemblies. It is believed this is because the viscosity of foam is considerably higher than the viscosity of a pure liquid and because some of the liquid is substituted for gas which leads to higher velocities in the valve. Both of these conditions result in higher pressure losses through the valve. Low product flow rates are important for many cosmetic products, including hair sprays and deodorants, wherein the lower the flow rate makes it easier to control the amount of product applied.

A conventional aerosol valve may be modified according to the principles of the present invention as illustrated in FIG. 7. The conventional valve is one manufactured by Seaquist Valve Company of Cary, Ill. U.S.A., and the modifications to it may be analogously incorporated in other valves of similar construction.

In particular, the valve assembly is designated generally by reference numeral 700 in FIG. 7 and includes many elements which are identical or functionally analogous to elements incorporated in the valve assembly 500 illustrated in FIG. 5. The analogous or identical elements in FIG. 7 are identified with reference numerals having the last two digits identical to the last two digits of the corresponding elements in the embodiment of FIG. 5.

The assembly 700 includes a valve body 713 mounted to a cup 709 for attachment to the aerosol container (not illustrated). The valve body 713 includes four, circumferentially spaced, identical spring support members 791. The support members 791 are disposed within the spring chamber 747 and project above a generally horizontal bottom wall 793 to support a spring 745 in a spring chamber 747 defined within the housing or body 713. The spring 745 biases a valve member 749 upwardly against a gasket 715 in the closed position. An upwardly projecting tubular member or valve stem 720 extends upwardly through the gasket 715 and defines a valve stem passage 722 with a valve stem orifice or restrictor 769.

The valve body horizontal wall 793 defines a centrally disposed choke orifice or restrictor 760. On the downstream side of the restrictor 760 (on the upwardly facing surface of the bottom wall 793) there is a concave recess around the outlet of the restrictor orifice.

A tubular member 730 projects downwardly from the valve body bottom wall 793. The tubular member 730 has a generally annular cylindrical configuration and is received within a cylindrical, upper, open end of a dip tube 734. A separate insert member 733 is mounted within the open bottom end of the tubular member 730. The lower end of the member 733 is frustoconical and is engaged by a crimp in the dip tube 734 so as to hold the member 733 in position in the downwardly projecting tubular member 730. The member 733 has a first passage 738 defined in an upper cross wall 795 functioning as a liquid restrictor 738. The volume within the tubular member 730 between the insert member cross wall 795 and the lower surface of the valve body bottom wall 793 is a mixing chamber or region 732. The mixing region 732 receives the liquid product from the liquid passage 738 and receives the permanent propellant gas which enters through a second passage 744 which is laser cut into the downwardly projecting tubular member 730.

The size and positions of the orifices and passages are selected to minimize slug flow and bubble flow while providing the flow conditions above described.

In one contemplated commercial embodiment, the stem orifice 769 is circular and has a diameter of about 0.013 inch, the choke restrictor 760 defines a circular orifice with a diameter of about 0.013 inch, the gas passage 744 is cylindrical and has a diameter in the range of about 0.006 inch to about 0.010 inch, and the liquid passage 738 is cylindrical and has a diameter of about 0.080 inch. The center line of the gas passage 744 is about 0.01 inch below the bottom surface of the valve housing bottom wall 793. The diameter of the mixing chamber 732 is about 0.082 inch, and the distance between the upper surface of the liquid restricting cross wall 795 and the lower surface of the valve body bottom wall 793 is about 0.10 inch.

It will be readily observed from the foregoing detailed description of the invention and from the illustrated embodiments thereof that numerous variations and modifications may be effected without departing from the true spirit and scope of the novel concepts or principles of this invention.

What is claimed is:

1. An aerosol discharge valve assembly for regulating the flow of a liquid product from an aerosol container pressurized substantially by a permanent propellant gas, said assembly comprising:
   (a) a control valve mounted to said container;
   (b) an exit nozzle;
   (c) a tubular member projecting upwardly and outwardly of the container and defining a passage surmounted by said exit nozzle through which an atomized mixture of said propellant gas and liquid product can flow out of the container;
   (d) a tubular member projecting downwardly in said container, said control valve being operable between open and closed positions for controlling flow through said control valve and through said tubular members;
   (e) first passage means for conveying the liquid into said downwardly projecting tubular member under gas pressure for conveyance to a mixing region in said valve assembly;
   (f) second passage means downstream of the first passage means for conveying the pressurized gas separately from the liquid product to said downwardly projecting tubular member for conveyance into said mixing region;
   (g) at least one intermediate choke restrictor between the mixing region and the exit nozzle through which the mixture of liquid product and pressurized gas is forced to pass; and
   (h) the size of the choke restrictor relative to said first and second passage means being selected to provide at least substantially sonic velocity choked flow through the choke restrictor at and above a selected minimum internal gas pressure, said mixed liquid product and propellant gas passing through said choke restrictor such that the liquid product, in response to changes from subsonic velocity flow to sonic velocity flow and the return to subsonic velocity flow, breaks up into fine liquid droplets comprising a highly dispersed foamed liquid product.

2. An aerosol discharge valve assembly for regulating the flow of a liquid product from an aerosol container pressurized substantially by a permanent propellant gas, said assembly comprising:
   (a) a control valve mounted to said container;
   (b) an exit nozzle;
   (c) a tubular member projecting upwardly and outwardly of the container and defining a passage surmounted by said exit nozzle through which an atomized mixture of said propellant gas and liquid product can flow out of the container;
   (d) a tubular member projecting downwardly in said container, said control valve being operable between open and closed positions for controlling flow through said control valve and through said tubular members;
   (e) first passage means for conveying the liquid into said downwardly projecting tubular member under gas pressure for conveyance to a mixing region in said valve assembly;
   (f) second passage means downstream of the first passage means for conveying the pressurized gas separately from the liquid product to said downwardly projecting tubular member for conveyance into said mixing region;
   (g) at least one intermediate choke restrictor between the mixing region and the exit nozzle through which the mixture of liquid product and pressurized gas is forced to pass; and
   (h) the sizes and locations of said choke restrictor, mixing region, first passage means, and second passage means being such that the volumetric ratio of said gas to liquid product dispensed at atmospheric pressure is less than approximately 5:1.

3. An aerosol valve assembly for regulating the flow of a liquid product from an aerosol container pressurized substantially by a permanent propellant gas, said assembly comprising:
   (a) a valve having (1) a body for being mounted to said container, (2) a valve member within said body movable between open and closed positions for controlling flow through said valve body, (3) a valve stem projecting from said valve body downstream of said valve member, (4) a valve stem passage through said stem, through which an atomized mixture of said propellant gas and liquid product can flow out of said container, and (5) a valve stem orifice for restricting the flow of said mixture through said valve stem passage;
   (b) chamber means for defining (1) a mixing chamber upstream of said valve member, (2) at least a portion of a first passage means for conveying said liquid product under gas pressure into said mixing chamber, and (3) at least a portion of a second passage means for conveying said propellant gas separately from said liquid product into said mixing chamber downstream of said first passage means; and
   (c) at least one choke restrictor through which the mixture of liquid product and gas is forced to flow, said choke restrictor being located between said valve member and mixing chamber downstream of said second passage means, the size of said choke restrictor being selected to provide substantially sonic velocity choked flow through said choke restrictor at and above a selected minimum internal container gas pressure.

4. An aerosol valve assembly for regulating the flow of a liquid product from an aerosol container pressurized substantially by a permanent propellant gas, said assembly comprising:
   (a) a valve having (1) a body for being mounted to said container, (2) a valve member within said body movable between open and closed positions for controlling flow through said valve body, (3) a valve stem projecting from said valve body downstream of said valve member, (4) a valve stem passage through said stem, through which an atomized mixture of said propellant gas and liquid product can flow out of said container, and (5) a valve stem orifice for restricting the flow of said mixture through said valve stem passage;
   (b) chamber means for defining (1) a mixing chamber upstream of said valve member, (2) first passage means for conveying said liquid product under gas pressure into said mixing chamber, and (3) at least a portion of a second passage means for conveying said propellant gas separately from said liquid product into said mixing chamber downstream of said first passage means; and
   (c) at least one choke restrictor through which the mixture of liquid product and gas is forced to pass, said choke restrictor being located between said valve member and mixing chamber downstream of said second passage means;
   (d) the sizes and locations of said choke restrictor, chamber means, first passage means, and second passage means being such that the volumetric ratio of said gas to liquid product dispensed at atmospheric pressure is less than approximately 5:1.

5. The assembly in accordance with claims 1 or 2 in which said assembly includes a body for being mounted to said container, body including a tail section that defines at least part of said mixing region and that is adapted to be connected with the upper open end of a dip tube, said tail section further defining said first passage means and a downstream orifice that functions as said choke restrictor.

6. The assembly in accordance with claim 5 in which a portion of said tail section has a cylindrical configuration and extends upstream of said valve body.

7. The assembly in accordance with claims 1 or 2 in which
said control valve includes a valve body defining a cavity for receiving a valve member and for communicating with said choke restrictor;
said assembly includes a compression spring in said cavity for biasing said valve member to a closed position; and
said choke restrictor is located adjacent said cavity upstream of said spring.

8. The assembly in accordance with claim 7 in which
said spring has a downstream end engaging said valve member and an upstream end retained by said body in said cavity upstream of said downstream end; and
said choke restrictor is spaced upstream of an upstream end of said spring.

9. The assembly in accordance with claim 1 in which said choke restrictor is closer to said second passage means than to said first passage means.

10. The assembly in accordance with claim 1 in which said first passage means is defined at least in part by a flow restrictor orifice.

11. The assembly in accordance with claim 1 in which said second passage means is defined at least in part by a flow restrictor orifice.

12. The assembly in accordance with claims 1 or 2 in which said assembly further includes a dip tube mounted to said downwardly projecting tubular member adapted in use to extend into said liquid product in the container.

13. The assembly in accordance with claims 1 or 2 in which
said mixing region is defined by a mixing chamber that has a generally cylindrical interior volume; and
the diameter of said choke restrictor is in the range of about 3% to about 40% of the diameter of said mixing chamber interior volume.

14. The assembly in accordance with claim 1 in which said choke restrictor defines a generally cylindrical orifice having a diameter in the range of about 0.03 mm. to about 1.0 mm.

15. The assembly in accordance with claim 1 in which said choke restrictor is in the form of a capillary tube.

16. The assembly in accordance with claim 1 further including a collapsible bladder for containing said liquid product and for being disposed within the container while being subjected to the pressure of said gas occupying the space in the container around the bladder to thereby pressurize said liquid product within the bladder.

17. The assembly in accordance with claim 1 in which the ratio of the total minimum cross-sectional flow areas of said first passage means to said second passage means is within the range of about 10:1 to about 400:1.

18. The assembly in accordance with claims 1 or 2 in which said first passage means includes a plurality of separate passages.

19. The assembly in accordance with claims 1 or 2 in which said second passage means includes a plurality of separate passages.

20. The assembly in accordance with claims 1 or 2 in which said control valve includes a movable valve member and in which there are a plurality of choke restrictors upstream of said valve member.

21. The assembly in accordance with claim 1 in which said second passage means includes a porous membrane.

22. The assembly in accordance with claim 1 in which said first passage means includes a porous tube.

23. The assembly in accordance with claim 4 in which said body includes a tail section that defines at least part of said chamber means and that is adapted to be connected with the upper open end of a dip tube, said tail section having a first cross wall defining said first passage means and a second cross wall spaced upstream of said first cross wall, said second cross wall defining an orifice that functions as said choke restrictor.

24. The assembly in accordance with claim 23 in which a portion of said tail section has a cylindrical configuration and is unitary with, and projects upstream of, said valve body.

25. The assembly in accordance with claims 3 or 4 in which
said valve body defines a cavity for receiving said valve member and for communicating with said choke restrictor;
said assembly includes a compression spring in said cavity for biasing said valve member to said closed position; and
said choke restrictor is located adjacent said cavity upstream of said spring.

26. The assembly in accordance with claim 25 in which
said spring has a downstream end engaging said valve member and an upstream end retained by said body in said cavity upstream of said downstream end; and
said choke restrictor is spaced upstream of an upstream end of said spring.

27. The assembly in accordance with claims 3 or 4 in which said first passage means further includes a dip tube adapted in use to extend into said liquid product in the container.

28. The assembly in accordance with claims 3 or 4 in which
said mixing chamber has a generally cylindrical interior volume; and
the diameter of said choke restrictor is in the range of about 3% to about 40% of the diameter of said mixing chamber interior volume.

29. The assembly in accordance with claims 3 or 4 in which there are a plurality of said first passage means.

30. The assembly in accordance with claims 3 or 4 in which there are a plurality of said second passage means.

31. The assembly in accordance with claims 3 or 4 in which there are a plurality of said choke restrictors upstream of said valve member.

32. The assembly in accordance with claims 3 or 4 in which said first passage means includes a porous dip tube.

33. A method for regulating the flow of a liquid product from a discharge nozzle on an aerosol container that is pressurized substantially by a permanent propellant gas, said method comprising the steps of:
(a) conveying said liquid product under pressure to a mixing region;
(b) conveying said permanent propellant gas separately to said mixing region; and
(c) passing the liquid and gas mixture through at least one choke restrictor that is located between said mixing region and said discharge nozzle and that is sized to provide substantially sonic velocity choked flow through said choke restrictor at and above a selected minimum internal container gas pressure.

34. A method for regulating the flow of a liquid product from a discharge nozzle on an aerosol container that is pressurized substantially by a permanent propellant gas, said method comprising the steps of:
(a) conveying said liquid product under pressure through a first passage to a mixing region;
(b) conveying said permanent propellant gas separately through a second passage to said mixing region; and
(c) passing the liquid and gas mixture through at least one choke restrictor that is located between said mixing region and said discharge nozzle with the sizes and locations of said choke restrictor, mixing region, first passage, and second passage being such that the volumetric ratio of said gas to liquid product dispensed at atmospheric pressure is less than approximately 5:1.

35. The method in accordance with claims 33 or 34 in which step (b) includes conveying at least one of the gases of nitrogen, carbon dioxide, oxides of nitrogen, and air.

36. A discharge valve for regulating the flow of a liquid product from an aerosol container pressurized substantially by a permanent gas propellant and comprising:
 (a) first passage means for conveying the liquid under gas pressure to a mixing region,
 (b) second passage means for conveying the pressurized gas separately from the liquid into the mixing region,
 (c) an exit nozzle through which an atomized mixture of liquid and gas is forced to exit from the container, and
 (d) at least one intermediate restrictor between the mixing region and the exit nozzle through the mixture of liquid and gas is forced to pass,
 wherein:
 (e) the size of the restrictor relative to said first and second passage means is selected to ensure that at least substantially choked or sonic flow results through the restrictor.

37. A discharge valve for regulating the flow of a liquid product from an aerosol container pressurized substantially by a permanent gas propellant and comprising:
 (a) first passage means for conveying the liquid under gas pressure to a mixing region,
 (b) second passage means for conveying the pressurized gas separately from the liquid into the mixing region,
 (c) an exit nozzle through which an atomized mixture of liquid and gas is forced to exit from the container, and
 (d) at least one intermediate restrictor between the mixing region and the exit nozzle through which the mixture of liquid and gas is forced to pass,
 wherein:
 (e) the sizes of the first and second passage means are so selected, in relation to one another and to the size of the intermediate restrictor, that the volumetric ratio of gas to liquid dispensed from the aerosol container at atmospheric pressure is less than approximately 5:1.

38. A valve according to claim 36 or claim 37 in which the restrictor is positioned so that the second passage means is located substantially nearer to the restrictor than to the first passage means.

39. A valve according to claim 36 in which the pressurized liquid is conveyed into the mixing region via a flow controlling orifice formed in the first passage means.

40. A valve according to claim 36 in which the second passage means comprises an orifice leading into the mixing region.

41. A valve according to claim 36 in which the first passage means is a capillary dip tube adapted in use to extend into the liquid in the container where said capillary dip tube is of dimension selected so as to act as a flow controlling device without the need for a further flow controlling orifice.

42. A valve according to claim 36 in which the first passage means is a dip tube adapted in use to extend into the liquid in the container, and in which the mixing region is formed as an extension of the dip tube into which the second passage means leads.

43. A valve according to claim 36 in which the mixing region is cylindrical, and the diameter of the intermediate restrictor is in the range 10% to 60% of the diameter of the mixing region.

44. A valve according to claim 36 in which the diameter of the intermediate restrictor is in the range 0.2 to 1.0 mm.

45. A valve according to claim 36 in which the restrictor is in the form of a capillary tube.

46. A valve as claimed in claim 36 in which the liquid is contained in a collapsible sachet within the container and is subjected to the pressure of the gas occupying the space between the sachet and the container wall, to thereby pressurize the liquid within the sachet.

47. A valve according to claim 40 in which the ratio of the total minimum cross-sectional areas of the first passage means to the second passage means is within the range of approximately 10:1 to 400:1.

48. A valve according to claim 36 in which there are a plurality of first and/or second passage means.

49. A valve according to claim 36 in which the second passage means comprises a porous membrane.

50. A valve according to claim 41 in which the dip tube itself is porous.

51. A method of regulating the flow of a liquid product from an aerosol container, comprising the steps of:
 (a) conveying the liquid under pressure to a mixing region through a first passage means,
 (b) conveying a permanent gas propellant separately to the mixing region through a second passage means, and
 (c) passing the liquid and gas mixture through at least one intermediate restrictor between the mixing region and an exit nozzle,
 wherein:
 (d) the size of the restrictor relative to said first and second passage means is selected to ensure that at least substantially choked or sonic flow results through the restrictor.

* * * * *